United States Patent
Iioka et al.

(10) Patent No.: US 8,358,444 B2
(45) Date of Patent: Jan. 22, 2013

(54) IMAGE FORMING APPARATUS CAPABLE OF PRINTING A COPY-FORGERY PATTERN

(75) Inventors: Mitsuru Iioka, Saitama (JP); Noribumi Sato, Saitama (JP); Jun Koyatsu, Saitama (JP); Kaoru Yamauchi, Saitama (JP); Keiichi Okada, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 440 days.

(21) Appl. No.: 12/543,049

(22) Filed: Aug. 18, 2009

(65) Prior Publication Data

US 2010/0079810 A1    Apr. 1, 2010

(30) Foreign Application Priority Data

Sep. 30, 2008   (JP) .................................. 2008-253749

(51) Int. Cl.
*H04N 1/40* (2006.01)
(52) U.S. Cl. .......................... 358/3.28; 358/2.1; 358/540
(58) Field of Classification Search .................. None
See application file for complete search history.

(56) References Cited

U.S. PATENT DOCUMENTS

| | | | | |
|---|---|---|---|---|
| 5,149,140 A * | 9/1992 | Mowry et al. | ................... | 283/93 |
| 5,390,003 A * | 2/1995 | Yamaguchi et al. | .......... | 399/366 |
| 5,873,604 A * | 2/1999 | Phillips | ............................ | 283/70 |
| 7,301,654 B2 * | 11/2007 | Matsunoshita et al. | ...... | 358/1.14 |
| 7,474,439 B2 * | 1/2009 | Uchida et al. | .................. | 358/1.9 |
| 7,609,396 B2 * | 10/2009 | Harada | .......................... | 358/1.1 |
| 7,609,989 B2 * | 10/2009 | Harada | ............................ | 399/80 |
| 7,684,089 B2 * | 3/2010 | Yamada | ....................... | 358/3.28 |
| 7,847,980 B2 * | 12/2010 | Aritomi et al. | ................ | 358/3.28 |
| 7,920,817 B2 * | 4/2011 | Oomura et al. | ................ | 399/366 |
| 7,929,159 B2 * | 4/2011 | Ono | ................................ | 358/1.14 |
| 7,999,973 B2 * | 8/2011 | Nakata et al. | ................. | 358/3.28 |
| 2004/0263912 A1 * | 12/2004 | Weng | ............................ | 358/3.28 |
| 2005/0135856 A1 * | 6/2005 | Uchida et al. | .................. | 399/411 |

(Continued)

FOREIGN PATENT DOCUMENTS

| JP | A-04-170569 | 6/1992 |
|---|---|---|
| JP | A-07-266770 | 10/1995 |

(Continued)

OTHER PUBLICATIONS

Japanese Office Action in Japanese Patent Application No. 2008-253749; dated Oct. 12, 2010 (with English-language translation).

*Primary Examiner* — King Poon
*Assistant Examiner* — Dung Tran
(74) *Attorney, Agent, or Firm* — Oliff & Berridge, PLC

(57) ABSTRACT

An image forming apparatus includes: an image data forming unit that forms an image data which includes a first dot image to be visible by copying, a second dot image to be invisible by copying, a hidden text portion and the background portion; and an image forming unit that carries out image formation by using the image data formed by the image data forming unit, the first dot image has a first color and includes dots having a dot size increased by decreasing the number of lines of dots, the second dot image has a second color and includes dots having a dot size decreased by increasing the number of lines of dots, and the second dot image is stacked on the first dot image in at least one of a hidden text portion or a background portion.

9 Claims, 21 Drawing Sheets

U.S. PATENT DOCUMENTS

| | | | | |
|---|---|---|---|---|
| 2006/0067759 | A1* | 3/2006 | Osaka | 399/366 |
| 2006/0256362 | A1* | 11/2006 | Guan et al. | 358/1.14 |
| 2006/0268311 | A1* | 11/2006 | Tamaru | 358/1.14 |
| 2006/0274939 | A1* | 12/2006 | Yamada | 382/173 |
| 2007/0065205 | A1* | 3/2007 | Takashima | 400/62 |
| 2007/0097414 | A1* | 5/2007 | Harada | 358/1.14 |

FOREIGN PATENT DOCUMENTS

| | | |
|---|---|---|
| JP | A-2001-238075 | 8/2001 |
| JP | A-2001-268337 | 9/2001 |

* cited by examiner

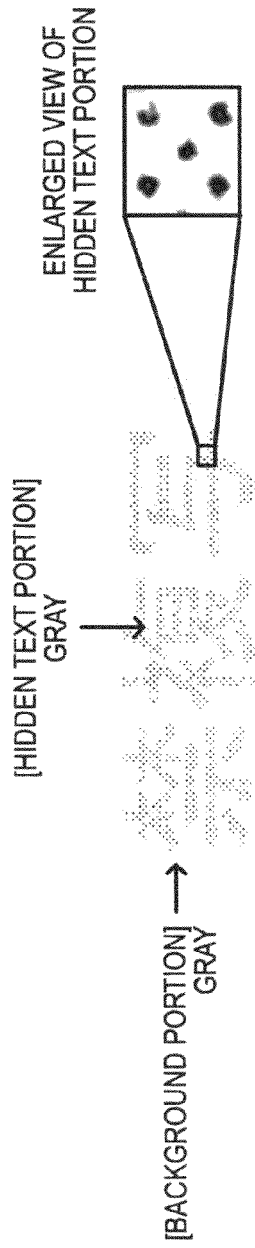

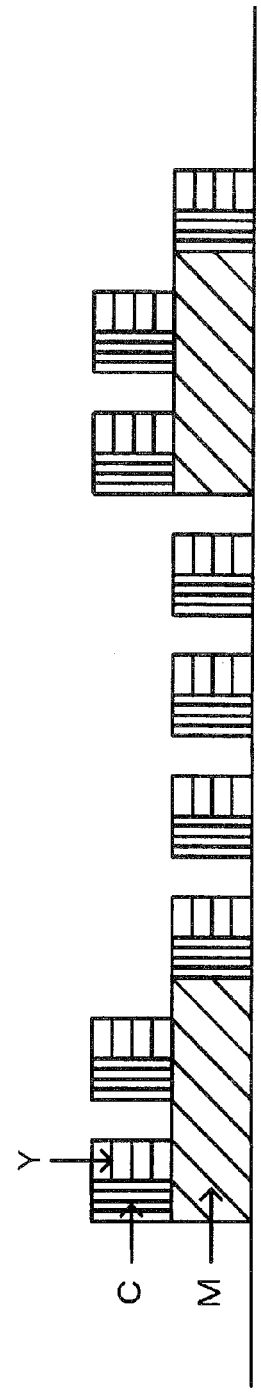
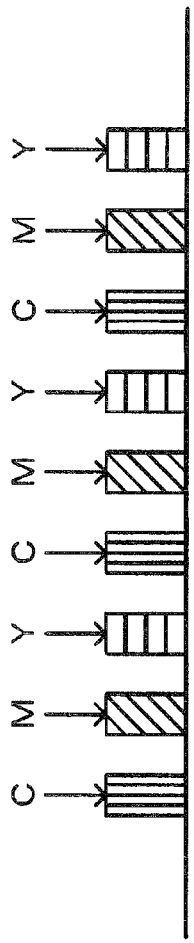
FIG. 3A
FIG. 3B

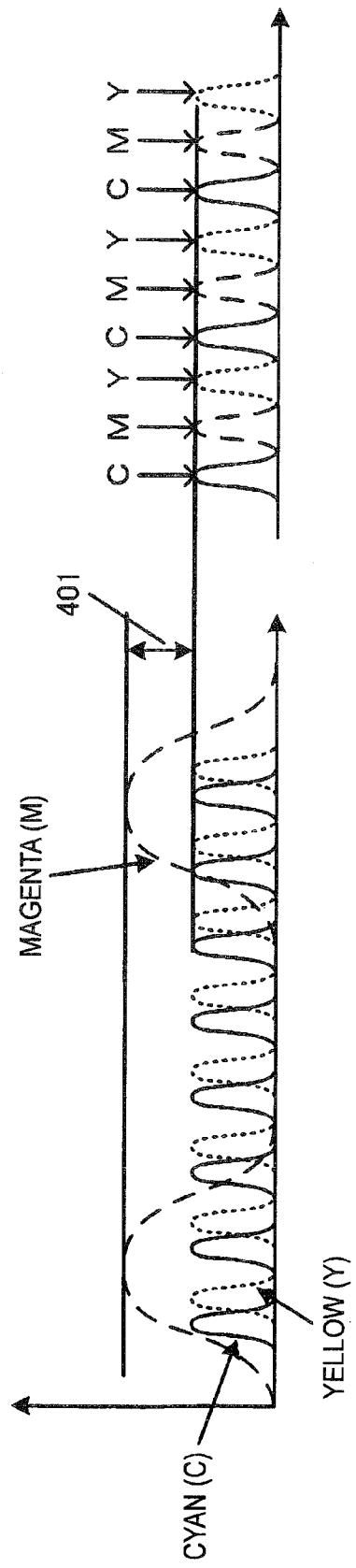

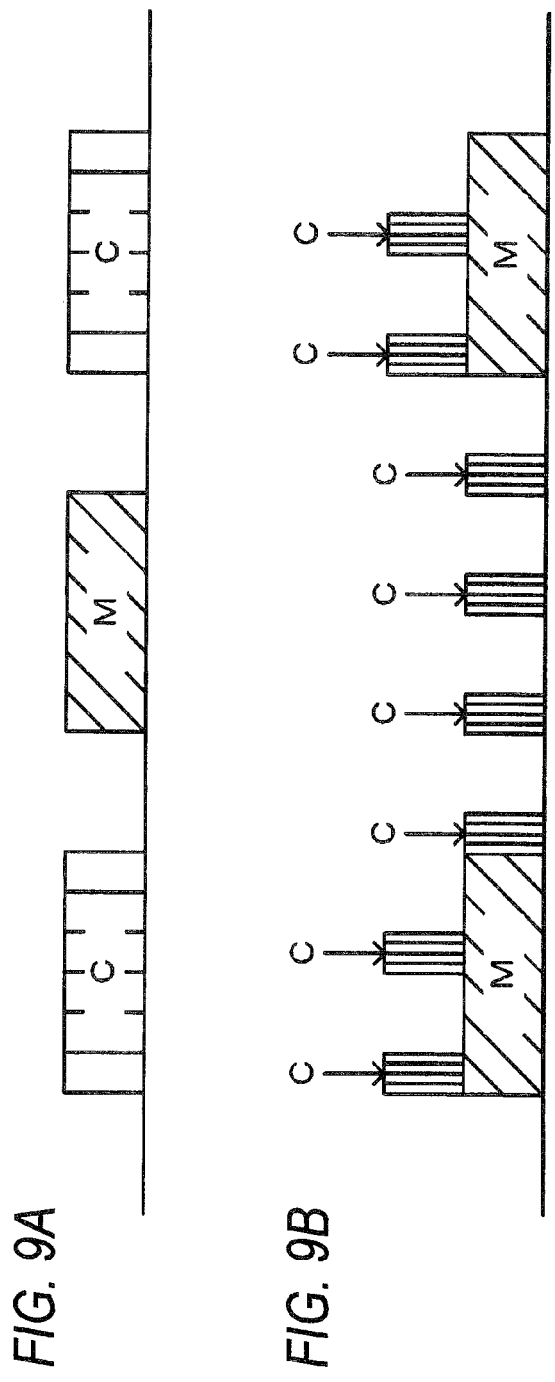

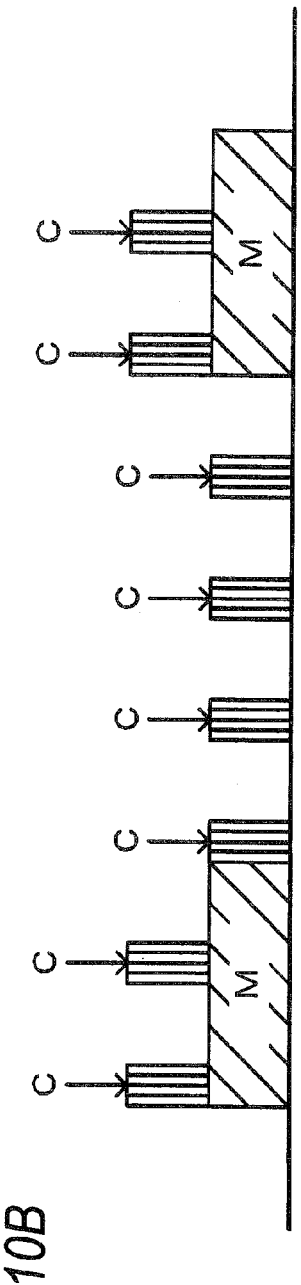
FIG. 10A
FIG. 10B

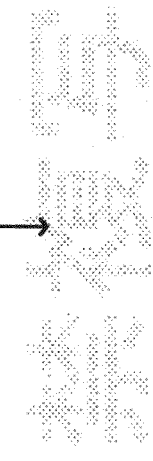
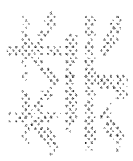
FIG. 11A
FIG. 11B
FIG. 11C

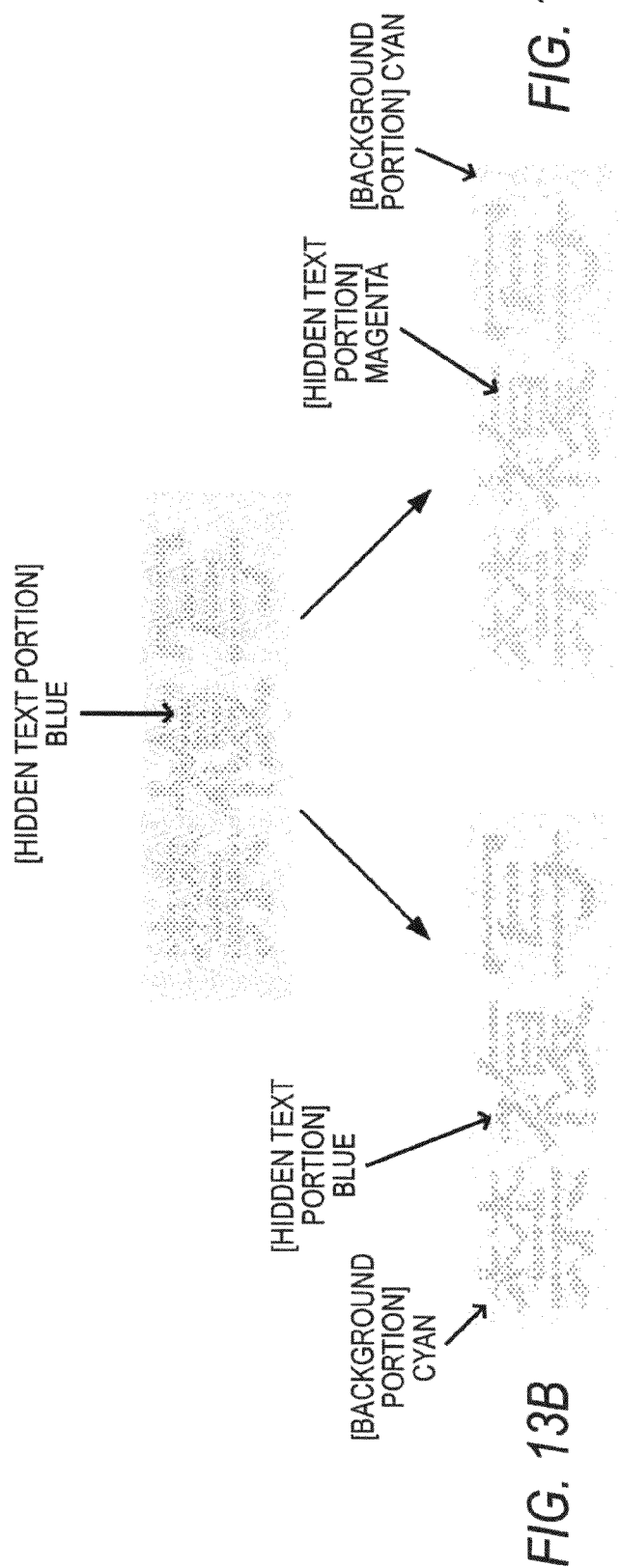

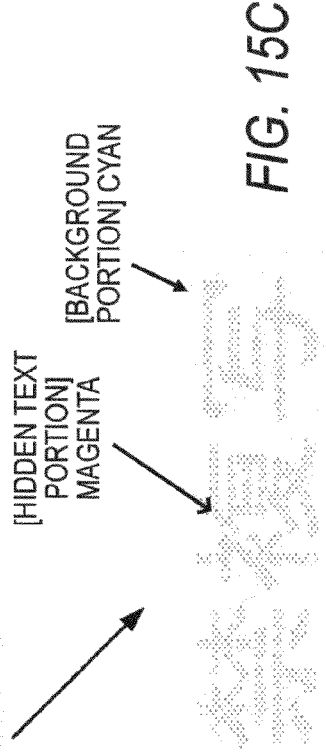
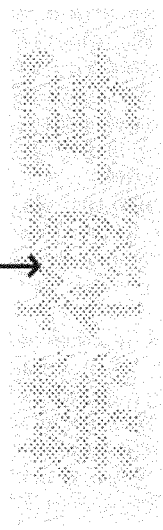
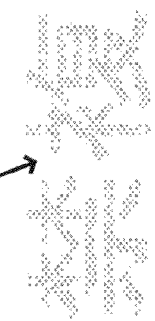
FIG. 15A
FIG. 15B
FIG. 15C

[HIDDEN TEXT PORTION] BLUE
FIG. 20A
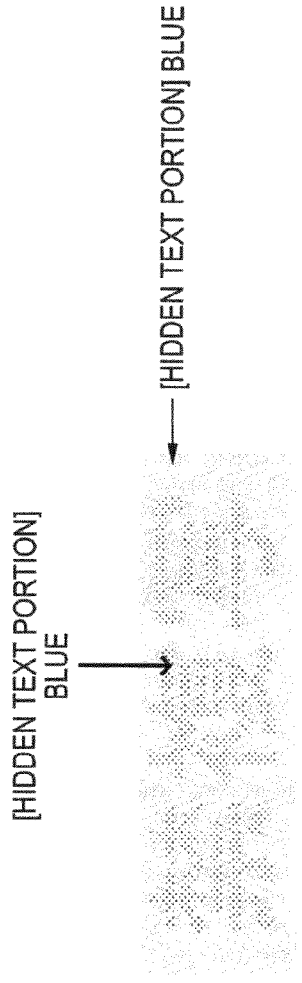
[HIDDEN TEXT PORTION] BLUE
[HIDDEN TEXT PORTION] BLUE
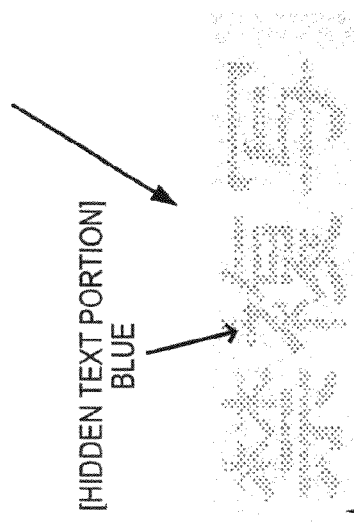
FIG. 20B
[BACKGROUND PORTION] LIGHT BLUE (LIGHTER THAN BLUE OF BACKGROUND PORTION IN FIG. 20A)
FIG. 20C
[BACKGROUND PORTION] LIGHT BLUE (LIGHTER THAN LIGHT BLUE OF BACKGROUND PORTION IN FIG. 20B)

IMAGE FORMING APPARATUS CAPABLE OF PRINTING A COPY-FORGERY PATTERN

CROSS-REFERENCE TO RELATED APPLICATIONS

This application is based on and claims priority under 35 USC 119 from Japanese Patent Application No. 2008-253749 filed on Sep. 30, 2008.

BACKGROUND

1. Technical Field

The present invention relates to an image forming apparatus.

2. Related Art

Printing with dot pattern code is a printing technology capable of inhibiting duplication of an important printed document and clearly showing that it is the duplication of a printed document even if it is an illegally duplicated one. This printing with dot pattern code is to print out a printed document having, in the background thereof, patterns fine enough to prevent recognition of a specific text prior to duplication or patterns fine enough to permit understanding of the contents of the document without being disturbed by the text.

In the printing with dot pattern code, it is possible to cause the text to appear so as to be visible when the document is illegally duplicated and thus show that it is the duplication of a printed document.

Examples of the specific test include "COPYING PROHIBITED" and "DUPLICATION PROHIBITED". They are texts warning against unauthorized copying or duplication.

SUMMARY

According to an aspect of the invention, an image forming apparatus includes: an image data forming unit that forms an image data which includes a first dot image to be visible by copying, a second dot image to be invisible by copying, a hidden text portion and the background portion; and an image forming unit that carries out image formation by using the image data formed by the image data forming unit. The first dot image has a first color, the first dot image includes dots having a dot size increased by decreasing the number of lines of dots, the second dot image has a second color, the second dot images includes dots having a dot size decreased by increasing the number of lines of dots, and the second dot image is stacked on the first dot image in at least one of a hidden text portion or a background portion.

BRIEF DESCRIPTION OF THE DRAWINGS

Exemplary embodiment(s) of the present invention will be described in detail based on the following figures, wherein:

FIGS. 2A and 2B illustrate one example of a dot pattern code;

FIGS. 3A and 3B illustrate the color arrangement in the hidden text portion and the background portion;

FIGS. 4A and 4B illustrate the contrast indicated by reading the dot pattern code with a readout system;

FIGS. 9A and 9B illustrate the state of color materials when a dot pattern code is printed out using any two of cyan, magenta, and yellow;

FIGS. 10A and 10B illustrate the state of color materials when a dot pattern code is printed out using any two of cyan, magenta, and yellow;

FIGS. 11A-11C illustrate the state of printing with dot pattern code;

FIGS. 13A, 13B and 13C illustrate the dot pattern code printed out according to the color arrangement of FIGS. 12A and 12B;

FIGS. 15A, 15B and 15C illustrate the dot pattern code printed out according to the color arrangement of FIGS. 14A and 14B;

FIGS. 20A, 20B and 20C illustrate the state of printing with dot pattern code.

DETAILED DESCRIPTION

An Exemplary embodiment of the image forming apparatuses of the invention will be hereinafter described specifically referring to accompanying drawings.

Figure 1:
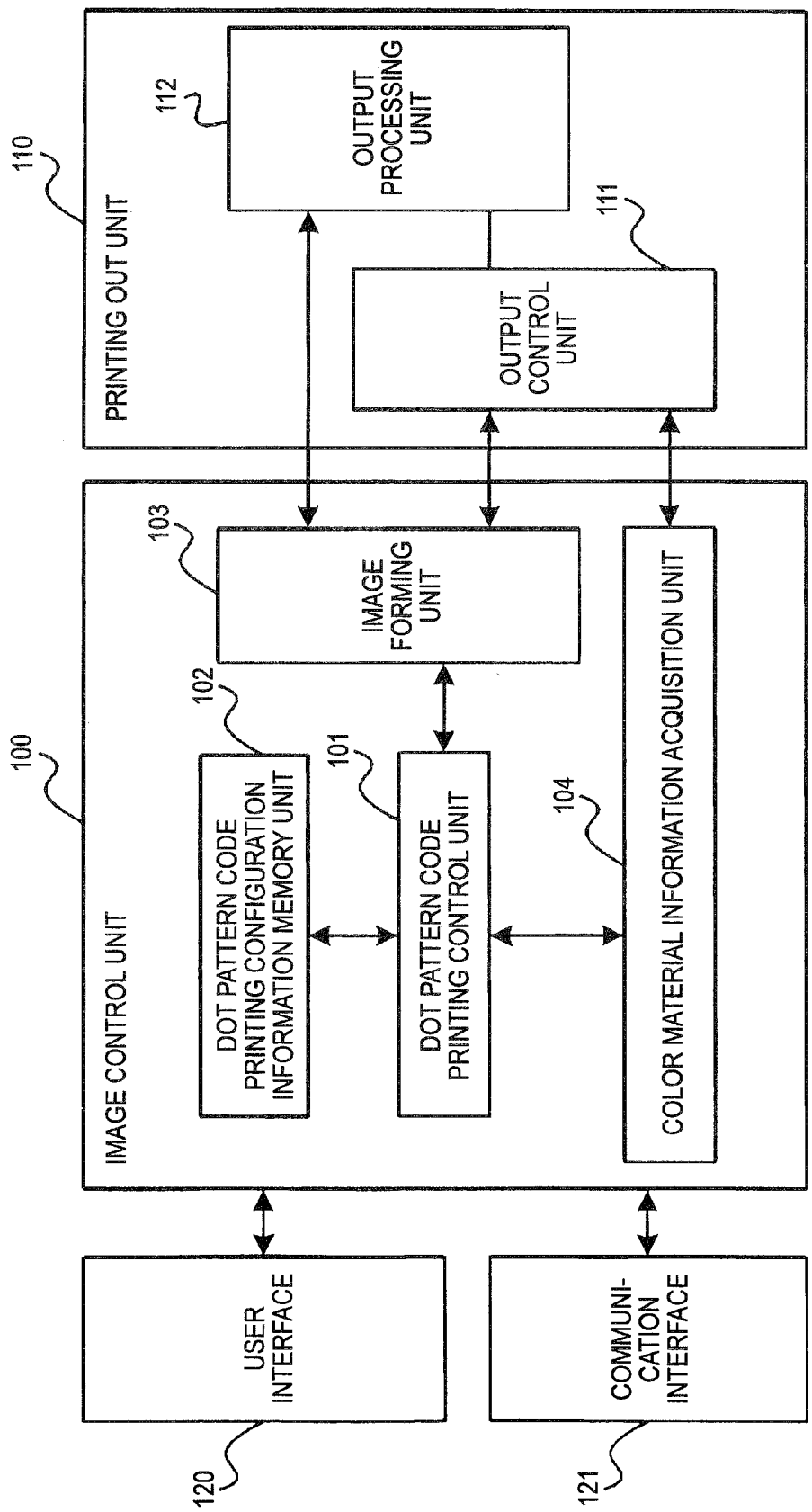
FIG. 1 is one example illustrating the constitution of an image forming apparatus to which the image forming apparatus according to the exemplary embodiment of the present invention has been applied.

FIG. 1 is one example illustrating the constitution of a printing system to which the image forming apparatus according to the exemplary embodiment of the present invention has been applied.

In FIG. 1, the image forming apparatus is equipped with an image control unit 100, a print output unit 110, a user interface unit 120, and a communication interface unit 121. When the instruction of printing with dot pattern code is sent from the user interface unit 120 or the communication interface unit 121 to the image control unit 100, the image control unit 100 starts the control processing for printing with dot pattern code.

Printing with dot pattern code is a printing method of embedding a hidden text (making the text latescent) in a printing medium such as printing paper (which medium will hereinafter be called "printing paper") and a mutual relationship in color between the hidden text portion and the background portion enables to form a dot pattern code. By this printing with dot pattern code, the printing paper on which a dot pattern code has been printed is judged whether it is an original document or a copy thereof.

One example of a specific dot pattern in printing with dot pattern code is illustrated in FIGS. 2A and 2B. FIGS. 2A and 2B illustrate a portion of a dot pattern code printed on printing paper and the dot pattern code is formed of a "hidden text portion" and a "background portion". Copying processing of the original of the printing paper on which the dot pattern code as illustrated in FIGS. 2A and 2B has been printed causes a difference in color hue or contrast between the hidden text portion and the background portion. As a result, the hidden text portion stands out (becomes apparent) and becomes visible. The printing paper with the hidden text appearing therefrom is the copy of the printing paper.

FIGS. 2A and 2B includes a view of a portion of the dot pattern code printed on the original of printing paper and also an enlarged view of a specific portion of the dot pattern code. In FIG. 2A (and FIGS. 2B, 6A, 6B, 9A, 9B, 11A, 11B, 11C, 13A, 13B, 13C, 15A, 15B, 15C, 18A, 18B, 18C, 20A, 20B and 20C), Japanese characters indicating "COPY PROHIBITED" is described as a hidden text. The hidden text is not limited by a certain language. In other words, characters written in any language may be used as the hidden text.

FIG. 2A illustrates an example in which the background portion of the dot pattern code has been printed out in gray color and the hidden text portion has been printed out also in gray color. This means that the hidden text portion and the background portion are not distinguishable from each other so that the hidden text does not require recognition of its presence.

FIG. 2B is an enlarged view of a portion of the hidden text portion. FIG. 2B shows that the hidden text portion is formed of a dot portion (dot image) and another portion. The hidden text is formed by placing dot portions integrally/continuously.

The image control unit 100 illustrated in FIG. 1 is equipped with a dot pattern code printing control unit 101, a dot pattern code printing configuration information memory unit 102, an image forming unit 103, and a color material information acquisition unit 104. According to the order of printing out of a dot pattern code as illustrated in FIGS. 2A and 2B, the dot pattern code printing control unit 101 acquires configuration information to be used for printing with dot pattern code stored in the dot pattern code printing configuration information memory unit 102 and conducts control processing in the printing with dot pattern code.

At the time of this control treatment, the dot pattern code printing control unit 101 can also carry out treatment in accordance with another information on color materials which the color material information acquisition unit 104 has acquired from an output control unit 111 of a printing output unit 120 such as kind of color materials used for printing with dot pattern code, remaining amount of each color material, and availability of each color material. The information on the kind of color materials is, for example, cyan, magenta, yellow, or black. The information on the remaining amount of each color material is, for example, a ratio of the remaining amount of each color material relative to the total amount. The information on the availability of each color material is, for example, that the color material cannot be used when the remaining amount is below a predetermined ratio or the apparatus does not carry the color material therein.

The control processing of printing with dot pattern code in the dot pattern code printing control unit 101 is processing for carrying out printing with dot pattern code by not only changing the number of lines of dots used for printing of the hidden text portion and the background portion but also changing the dot size of each screen.

An example of printing with dot pattern code to be performed by changing the number of lines of dots and dot size will hereinafter be described referring to FIGS. 3A to 21B.

The dot pattern code printing control unit 101 in which control processing of printing with dot pattern code for actualizing the number of lines of dots and dot size as illustrated in FIGS. 3A to 21B has been performed sends printing with dot pattern code data formed by the control processing of printing with dot pattern code to the image forming unit 103. The image forming unit 103 forms image data to be printed out based on the dot pattern code print data sent from the dot pattern code printing control unit 101.

When the image data is formed in the image forming unit 103, the resulting image data is sent to the output processing unit 112 and at the same time, a signal indicating completion of the formation of the image data is sent to the output control unit 111. The output control unit 111 controls preparation treatment such as heating of a heater for enabling output processing in an output processing unit 112.

The output control unit 111 manages information on color materials used for the output processing in the output processing unit 112.

The output processing unit 112 carries out output processing of the image data sent from the image forming unit 103 and thereby prints out a dot pattern code to printing paper.

Specific example of the control treatment of the printing with dot pattern code in the dot pattern code printing control unit 101 will next be described referring to FIGS. 3A to 21B.

FIGS. 3A and 3B illustrates the color arrangement state in the hidden text portion and the background portion.

FIG. 3A shows the color arrangement state of the hidden text portion. It is formed of a portion obtained by stacking two color materials different in color one after another and a portion obtained by placing one of the color materials to be stacked.

The portion of FIG. 3A obtained by stacking two color materials has a color arrangement structure in which a color material of cyan and a color material of yellow have been stacked on a color material of magenta. On the other hand, the portion obtained by placing only one color material has a color arrangement structure in which cyan and yellow have been arranged adjacent to each other. This indicates an example of printing out the underlying color material of magenta with the number of lines of dots smaller than that of the color material of cyan or yellow and at the same time printing out while using a screen of magenta having a dot size greater than that of the color materials of cyan and yellow. The color materials of cyan and yellow stacked on the color material of magenta are arranged adjacent to each other.

In FIG. 3A, the number of lines of dots of cyan or yellow is "9", while the number of lines of dots of magenta is "2". These two lines of dots for magenta have a dot size greater than that of another color material (cyan or yellow).

FIG. 3B shows color arrangement in the background portion. Cyan, magenta, and yellow are arranged at regular intervals without changing the number of lines of dots and dot size among them.

FIGS. 4A and 4B illustrate the contrast of the dot pattern code having color arrangement as illustrated in FIGS. 3A and 3B read with a readout system such as scanner.

In FIGS. 4A and 4B, FIG. 4A shows the contrast of the color materials of the hidden text portion having the color arrangement structure of FIG. 3A and the contrast of the color material of magenta is higher than that of cyan or yellow.

This means that the readout system such as scanner strongly recognizes magenta by reading the hidden text portion.

FIG. 4B shows the contrast of the background portion having the color arrangement structure of FIG. 3B read with the above readout system and the color materials of cyan, magenta, and yellow show the same level of contrast.

This means that the readout system such as scanner recognizes the color of the background portion as gray, that is, mixed color of these color materials.

Figure 6A:
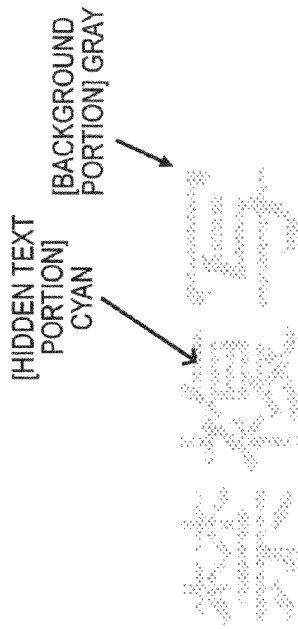
FIGS. 6A and 6B illustrate the state of printing with dot pattern code.

Printing paper printed according to the color arrangement structure as illustrated in FIGS. 3A and 3B and thus having the dot pattern code as illustrated in FIGS. 2A and 2B is subjected to copying processing. The dot pattern code in the resulting copy of the printing paper is shown in FIG. 6A. The term "copying processing" as used herein means processing actualized by "document readout processing" for reading the original of printing paper with a readout system and "document output processing" for outputting the image data obtained by the document readout processing from an output apparatus.

FIG. 6A illustrates the dot pattern code having the hidden text portion printed out in magenta color and the background portion printed out in gray color.

This occurs because in the dot pattern code, the contrast of magenta has been recognized strongly as illustrated in FIGS. 4A and 4B, while in the background portion, cyan, magenta, and yellow have been recognized at the same level as illustrated in FIGS. 4A and 4B.

As a result, there appears a large difference in color hue between the background portion of grey color indicated by recognition of cyan, magenta, yellow at the same level and the hidden text portion indicated by magenta.

Figure 6B:
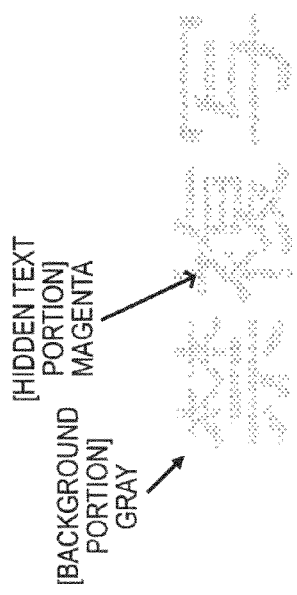

FIG. 6B illustrates the dot pattern code obtained by subjecting, to the copying processing, the original of printing paper which has been printed out after interchange between magenta and cyan of FIG. 3A. In other words, it illustrates the dot pattern code obtained by subjecting, to the copying processing, the original of printing paper having the hidden text portion having a color arrangement structure obtained by stacking color materials of magenta and yellow on the color material of cyan in FIG. 3A.

Since cyan and yellow are arranged adjacent to each other, the contrast becomes higher compared with color arrangement in which cyan and yellow are placed with a certain interval.

Figure 5A:
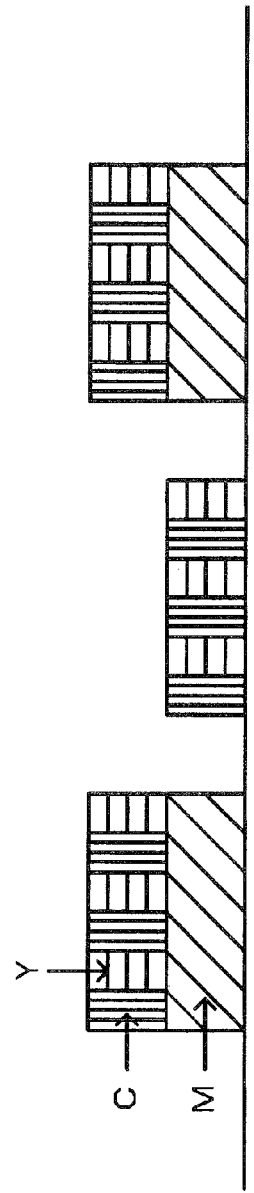
FIGS. 5A and 5B illustrate the color arrangement structure in which color materials of cyan and yellow have been stacked on a color material of magenta and cyan and yellow equal in the number of lines of dots are stacked on one line of dots of magenta.
Figure 5B:
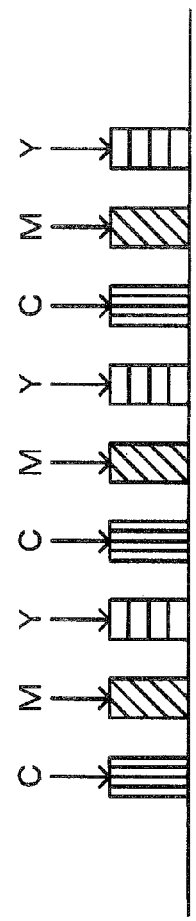

FIGS. 5A and 5B illustrate color arrangement analogous to those of FIGS. 3A and 3B and in it, color materials of cyan and yellow are stacked on a color material of magenta. Cyan and yellow equal in the number of lines of dots are stacked on one line of dots of magenta. This means that the dot size per line of dots of magenta is integral multiple of the dot size per line of dots of cyan and yellow.

FIG. 5A illustrates an example of a structure in which the dot size of magenta is "six times" as much as that of the dot size of cyan or yellow and cyan and yellow each having "3" lines of dots is stacked on magenta having "1" line of dots.

When the hidden text portion having the color arrangement as illustrated in FIG. 5A is subjected to copying processing, it provides higher contrast than the hidden text portion having the color arrangement as illustrated in FIG. 3A.

Figure 7A:
FIGS. 7A and 7B is another view illustrating the color arrangement of the dot pattern code printed on the original of printing paper illustrated in FIGS. 2A and 2B.
Figure 7B:
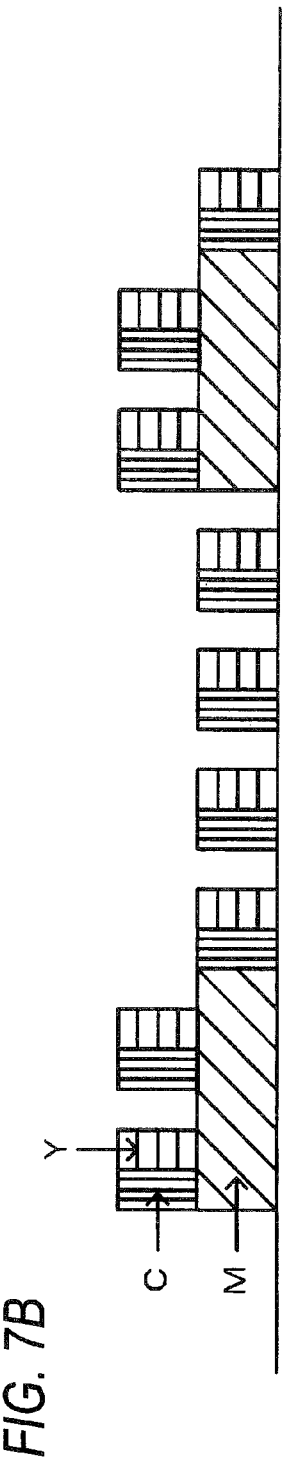

FIGS. 7A and 7B are other views illustrating the color arrangement of the dot pattern code printed on the original of printing paper illustrated in FIGS. 2A and 2B.

FIG. 7A illustrates the color arrangement of the hidden text portion of the dot pattern code in which only single black color has been arranged. FIG. 7B on the other hand illustrates the color arrangement of the background portion of the dot pattern code which is composed of a portion having two colors stacked one after another and a portion having only a single color.

In the two-color stacked portion, a color material of cyan and a color material of yellow are stacked on a color material of magenta, while in the single-color portion, color materials of cyan and yellow are arranged adjacent to each other. FIG. 7B illustrates an example of printing the color material of magenta with the number of lines of dot smaller than that of the color materials of cyan and yellow and at the same time, printing out the lines of dots of magenta with a dot size greater than that of the color materials of cyan and yellow.

Described specifically, FIG. 7B shows cyan and yellow each having "9" lines of dots and magenta having "2" lines of dots. These two lines of dots of magenta each has a dot size greater than that of the other color materials (cyan and yellow).

The hidden text portion illustrated in FIG. 7A is printed out with a dot size almost equal to that of magenta of FIG. 7B and printed out with lines of dots equal in number to those of magenta.

The original printing paper printed according to the color arrangement as illustrated in FIGS. 7A and 7B and having the dot pattern code as illustrated in FIGS. 2A and 2B is subjected to copying processing. The color arrangement of the dot pattern code in the copy of printing paper thus obtained is illustrated in FIG. 8A.

Figure 8A:
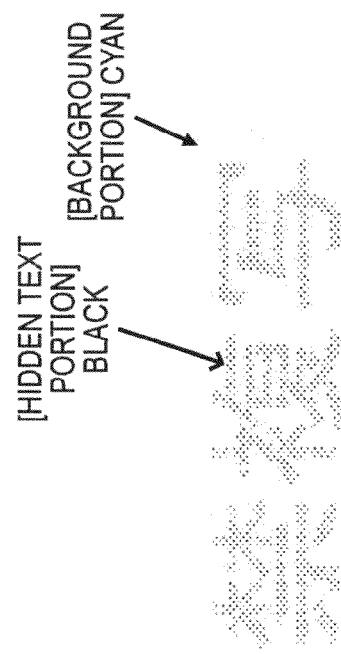
FIGS. 8A and 8B illustrate the state of printing with dot pattern code.

FIG. 8A illustrates the text portion of the dot pattern code printed out in a single black color and the background portion of the dot pattern code printed out in magenta color.

This means that the hidden text portion is printed out in black color as illustrated in FIG. 7A and the background portion is printed out in color obtained by stacking cyan and yellow on magenta as illustrated in FIG. 7B. The drawing reveals that in the background portion, magenta having a large dot size is strongly recognized.

This increases a difference in color hue between black color of the hidden text portion of the dot pattern code and magenta color of the background portion, whereby the hidden text portion is recognized from the copy of the printing paper.

Figure 8B:
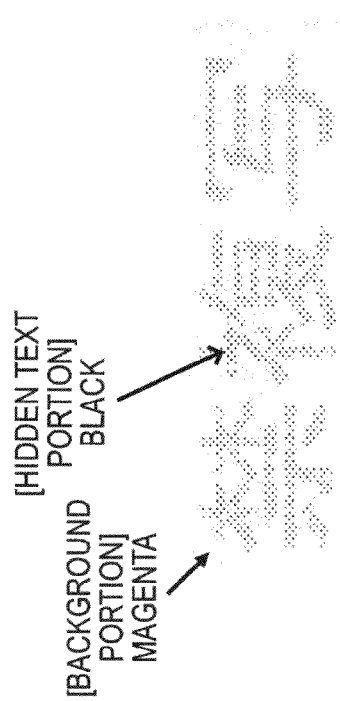

FIG. 8B illustrates the dot pattern code on the copy of printing paper obtained by subjecting, to the copying processing, the original of printing paper which has been printed out after interchange between magenta and cyan of FIG. 7B. In other words, it illustrates the dot pattern code obtained by subjecting, to the copying processing, the original of printing paper having the background portion having a color arrangement structure obtained by stacking color materials of magenta and yellow on the color material of cyan in FIG. 7B.

FIG. 8B shows the dot pattern code having the hidden text portion printed out in single black color and the background portion printed out in cyan color.

FIGS. 9A to 10B illustrate the state of color materials when a dot pattern code is printed out with any two of cyan, magenta, and yellow.

Referring to FIGS. 9A to 10B, an example of printing out the dot pattern code with cyan and magenta will next be described. Combination of colors is however not limited to them.

First, in FIGS. 9A and 9B, FIG. 9A shows the color arrangement structure of the hidden text portion in which cyan and magenta are arranged alternately.

FIG. 9B shows the color arrangement of the background portion and it is composed of a portion obtained by stacking two colors, that is, cyan and magenta and a portion obtained by placing only a single color.

In the two-color stacked portion, a color material of cyan is stacked on a color material of magenta, while in the single-color portion, a color material of cyan is printed out. FIG. 7B illustrates an example of printing the color material of magenta with the number of lines of dot smaller than that of the color material of cyan and at the same time, printing out the lines of dots of magenta with a dot size greater than that of the color material of cyan.

In the example shown in FIG. 9B, the number of lines of dots of magenta is "2", while the number of lines of dots of cyan is "8". The color material of magenta is formed of a dot size greater than that of the color material of cyan.

The colors of the hidden text portion illustrated in FIG. 9A each has also a dot size almost equal to that of the underlying magenta in FIG. 9B.

The dot pattern code printed out with the color arrangement illustrated in FIG. 9A and FIG. 9B is illustrated in FIG. 11A.

Both the hidden text portion and the background portion of the dot pattern code illustrated in FIG. 11A are printed out with a bluish hue resulting from the color arrangement of magenta and cyan. The hidden text portion and the background portion are therefore not distinguishable from each other so that the hidden text does not require recognition of its presence.

On the other hand, when the original of the printing paper on which the dot pattern code has been printed is subjected to copying processing, the hidden text portion is printed out on the copy of the printing paper in blue resulting from the combination of magenta and cyan as illustrated in FIG. 11B and the background portion is printed out in magenta color. The background portion is printed out in magenta color, because magenta color with a greater dot size is strongly recognized due to the color arrangement as illustrated in FIG. 9B.

In short, due to a difference in color hue between the hidden text portion and the background portion on the copy of the printing paper enables recognition of the hidden text portion.

Next, in FIGS. 10A and 10B, FIG. 10A shows the color arrangement of the hidden text portion and it has a structure in which magenta has been stacked on cyan.

FIG. 10B illustrates the color arrangement of the background portion and it is equal to that illustrated in FIG. 9B.

Both the hidden text portion and background portion of the dot pattern code having the color arrangement structure as illustrated in FIGS. 10A and 10B are printed out in a blue color hue. The hidden text portion and the background portion are not distinguishable from each other so that the hidden text does not require recognition of its presence.

When the original of the printing paper on which the dot pattern code has been printed is subjected to copying processing, the hidden text portion is printed out on the copy of the printing paper in blue color resulting from the combination of magenta and cyan and the background portion is printed out in magenta color, as illustrated in FIG. 11B. The color of the background portion is recognized strongly as magenta color because it has a greater dot size as a result of the color arrangement illustrated in FIG. 10B.

In short, the hidden text portion and the background portion of the copy of the printing paper differ from each other in color hue and only the hidden text portion is recognized.

The original of printing paper having a dot pattern code having the color arrangement obtained by the interchange between the color material of cyan and the color material of magenta in the background portion illustrated in FIG. 9B and FIG. 10B is subjected to copying processing and the resulting dot pattern code on the copy of the printing paper is illustrated in FIG. 11C. In short, cyan color having a large dot size is strongly recognized as the background portion and at the same time, the hidden text portion becomes blue.

Figure 12A:
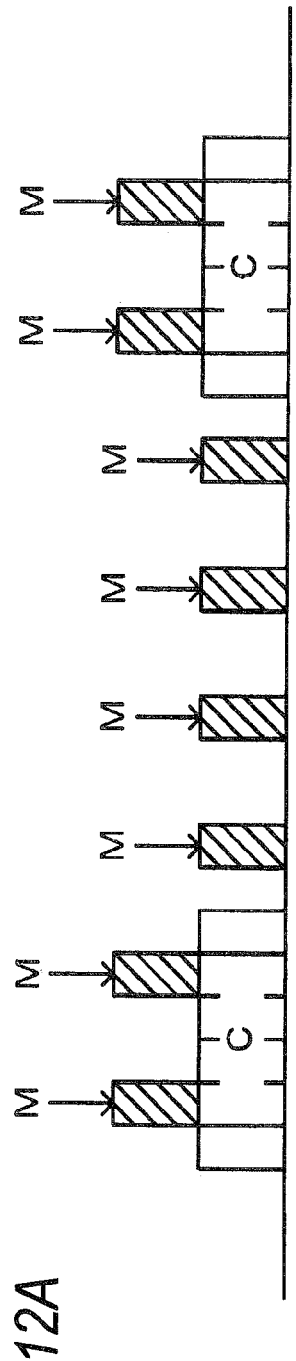
FIGS. 12A and 12B illustrate the state of color materials when a dot pattern code is printed out using any two of cyan, magenta, and yellow.
Figure 12B:
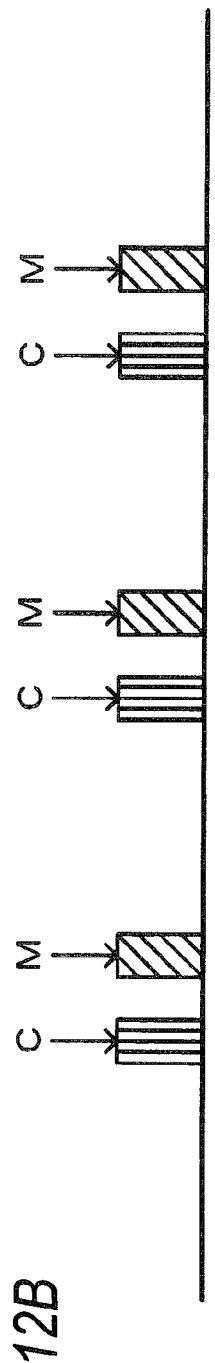

FIGS. 12A and 12B illustrate the state of color materials when a dot pattern code is printed out using any two colors of cyan, magenta, and yellow. Referring to FIGS. 12A and 12B, the dot pattern code to be printed out using only cyan and magenta will next be described.

In FIGS. 12A and 12B, FIG. 12A shows the color arrangement of the hidden text portion. The hidden text portion is formed of a portion in which two colors have been stacked and a portion in which only a single color has been placed.

The two-color stacked portion is obtained by stacking a color material of magenta on a color material of cyan, while the single color portion is obtained by placing the color materials of cyan at regular intervals. This drawing shows an example of printing the underlying color material of cyan with the number of lines of dots smaller than that of the color material of magenta and at the same time, printing out the lines of dots of cyan at a dot size greater than that of the lines of dots of magenta.

Described specifically, FIG. 12A shows magenta having "8" lines of dots and cyan having "2" lines of dots and the dot size of cyan is greater than that of magenta.

In the structure illustrated in FIG. 12B, a plurality of combinations having a color material of cyan and a color material of magenta to be printed out by using the same number of lines of dots and placed at regular intervals is arranged.

FIGS. 13A, 13B and 13C illustrate a printout example of a dot pattern code having the color arrangement structure illustrated in FIGS. 12A and 12B.

FIG. 13A illustrates a printout of a dot pattern code formed of a hidden text portion having the color arrangement illustrated in FIG. 12A and a background portion having the color arrangement illustrated in FIG. 12B. Since the hidden text portion is indicated in blue obtained by stacking magenta on cyan and the background portion is indicated in blue obtained by combining cyan with magenta, the hidden text portion and the background portion are not distinguishable from each other on the original of the printing paper so that the hidden text does not require recognition of its presence.

The original of the printing paper having the dot pattern code is then subjected to copying processing. The resulting dot pattern code is illustrated in FIG. 13B.

The background portion of the dot pattern code illustrated in FIG. 13B has a color obtained by stacking magenta on cyan as illustrated in FIG. 12A. Magenta colors are arranged at regular intervals so that the background portion becomes cyanish due to strong recognition of cyan. On the other hand, the hidden text portion becomes blue lighter than that of the background portion of the dot pattern code illustrated in FIG. 13A because combinations of cyan and magenta are arranged at regular intervals.

This means that the background portion and the hidden text portion in the dot pattern code after copying processing vary in contrast, making it possible to recognize the hidden text portion.

FIG. 13C illustrates a dot pattern code obtained by printing out after interchanging the color materials of the hidden text portion illustrated in FIG. 12A. Described specifically, in the portion in which two colors have been stacked, a color material of cyan is stacked on a color material of magenta. On the other hand, printout of the portion in which only a single color has been placed is performed with a color material of cyan.

Copying processing of the dot pattern code having such color arrangement enables strong recognition of magenta color as the hidden text portion.

Figures 14A, 14B:
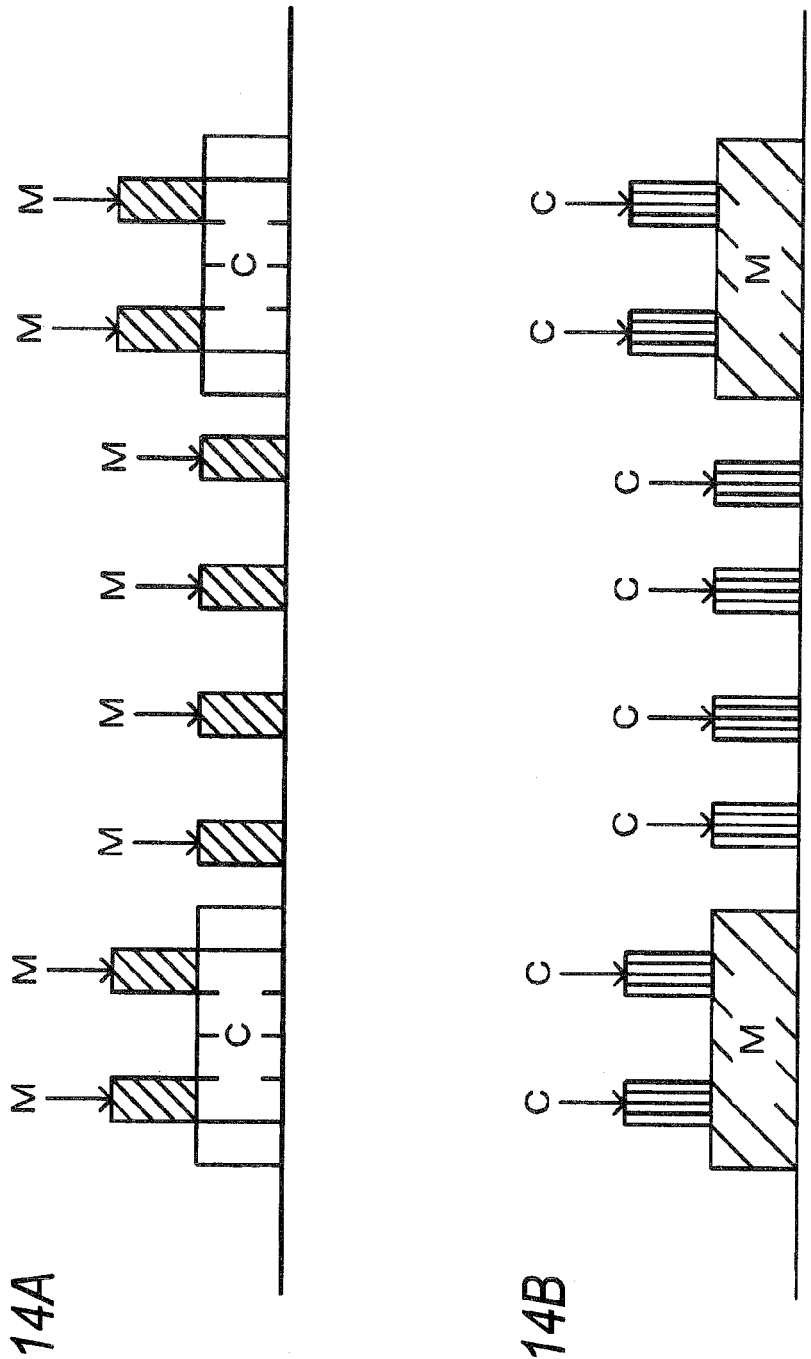
FIGS. 14A and 14B illustrate the state of color materials when a dot pattern code is printed out using any two of cyan, magenta, and yellow.

FIGS. 14A and 14B illustrate arrangement of color materials when a dot pattern code is printed out using any two of cyan, magenta, and yellow. Referring to FIGS. 14A and 14B, printing out with only cyan and magenta will next be described.

In FIGS. 14A and 14B, FIG. 14A illustrates color arrangement of a hidden text portion and this color arrangement is the same as that of FIG. 12A. Described specifically, the portion in which two colors have been stacked has color arrangement obtained by stacking a color material of magenta on a color material of cyan, while the portion in which only a single color has been arranged has a color arrangement structure composed of a color material of magenta.

FIG. 14B illustrates the color arrangement of the background portion and it is similar to the color arrangement of FIG. 14A except that the colors are interchanged with each other. Described specifically, the two-color stacked portion has a color arrangement structure obtained by stacking a color material of cyan on a color material of magenta, while the single color portion has a color arrangement structure composed only of a color material of cyan.

FIGS. 14A and 14B illustrate an example of printing the underlying color material with lines of dots less than those of the overlying color material and at the same time printing out the lines of dots of the overlying color material with a dot size greater than that of the underlying color material. In the example illustrated in FIG. 14A, the number of lines of dots of the underlying cyan is "2", while the number of lines of dots of magenta is "8". The color material of cyan is constituted of dots greater in size than that of the color material of magenta. In the example illustrated in FIG. 14B, the number of lines of dots of magenta is "2", while the number of lines of dots of cyan is "8". The color material of magenta is constituted of dots greater in size than that of the color material of cyan.

FIGS. 15A, 15B and 15C illustrate the dot pattern code printed out according to the color arrangement of FIGS. 14A and 14B.

FIG. 15A shows the hidden text portion printed out in blue according to the color arrangement illustrated in FIG. 14A and the background portion printed out also in blue according to the color arrangement illustrated in FIG. 14B. The hidden text portion and the background portion are therefore not distinguishable from each other so that the hidden text does not require recognition of its presence.

The original of the printing paper having the above dot pattern code is subjected to copying processing. FIG. 15B illustrates the dot pattern code on the copy of the printing paper.

In FIG. 15B, in the dot pattern code illustrated in FIG. 14A, the contrast of magenta color is recognized more strongly than the contrast of cyan color so that the hidden text portion is printed out in cyan color. On the other hand, in the background portion illustrated in FIG. 14B, the contrast of magenta color is recognized more strongly than the contrast of cyan color so that the background portion is printed out in magenta color on the copy of the printing paper.

This means that the background portion of the dot pattern code after copying differs in color hue from the background portion of the dot pattern code of the original of the printing paper and the color of the hidden text portion and also the color of the background portion change in the copy of the printing paper, leading to recognition of the hidden text portion.

FIG. 15C illustrates the color arrangement state of the copy of the printing document when the background portion has the color arrangement of FIG. 14A and the hidden text portion has the color arrangement of FIG. 14B.

Figure 16A:
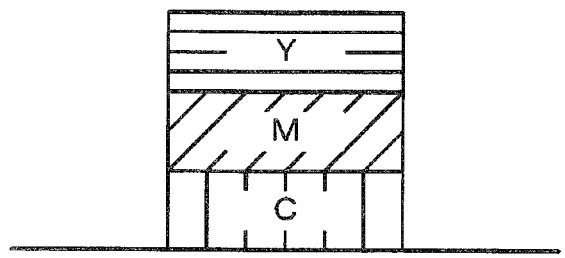
FIGS. 16A and 16B illustrates the state of color materials when a dot pattern code is printed out using three colors, that is, cyan, magenta, and yellow.
Figure 16B:
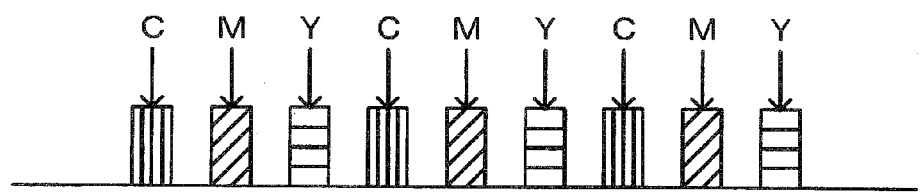

FIGS. 16A and 16B illustrate color materials of cyan, magenta, and yellow when a dot pattern code is printed out using these three colors.

FIG. 16A is a color arrangement state of a hidden text portion obtained by stacking three colors, that is, cyan, magenta, and yellow one after another. In the structure illustrated in FIG. 16A, cyan, magenta, and yellow are arranged in this order from the bottom and they constitute "process black" which is a color analogous to simple black color.

FIG. 16B is a color arrangement state of a background portion obtained by placing all the color materials of cyan, magenta, and yellow at regular intervals with the same number of lines of dots. The background portion illustrated in FIG. 16B is constituted of more lines of dots than the hidden text portion of FIG. 16A and the dot size of the background portion is greater than that of the hidden text portion.

Figures 17A, 17B:
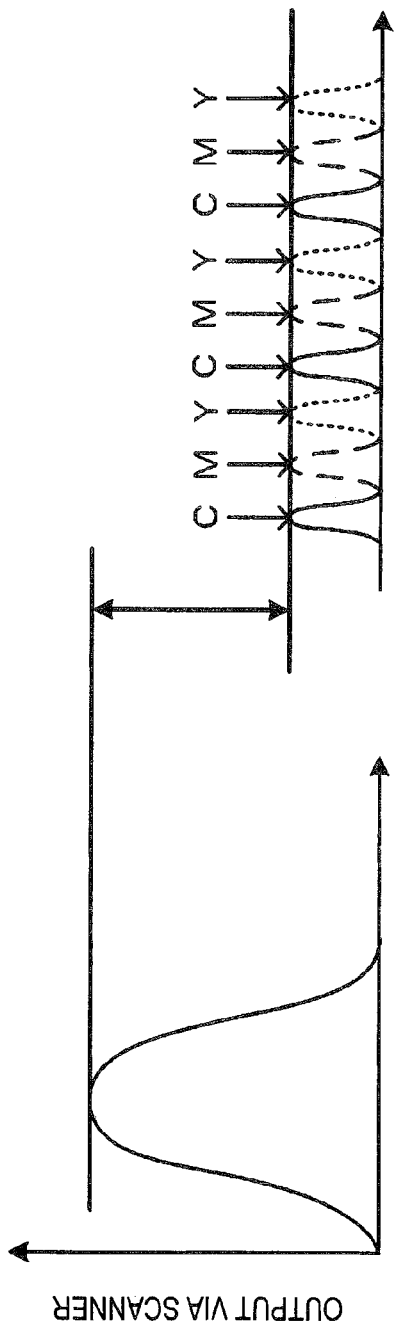
FIGS. 17A and 17B illustrate the contrast of the color materials obtained by reading, with a readout system, the dot pattern code printed out according to the color arrangement of FIGS. 16A and 16B.

A dot pattern code is printed out according to the color arrangement of FIGS. 16A and 16B and the contrast of the color materials is readout by using a readout system. FIGS. 17A and 17B illustrate the result of it.

FIG. 17A illustrates the contrast output after reading the hidden text portion of the dot pattern code printed out according to the color arrangement as illustrated in FIG. 16A, while FIG. 17B illustrates the contrast output after reading the background portion of the dot pattern code printed out according to the color arrangement as illustrated in FIG. 16B.

These drawings suggest that the contrast of the hidden text portion illustrated in FIG. 17A is higher than the contrast of the background portion illustrated in FIG. 17B so that the readout system recognizes the hidden text portion more strongly than the background portion.

Figures 18A, 18B, 18C:
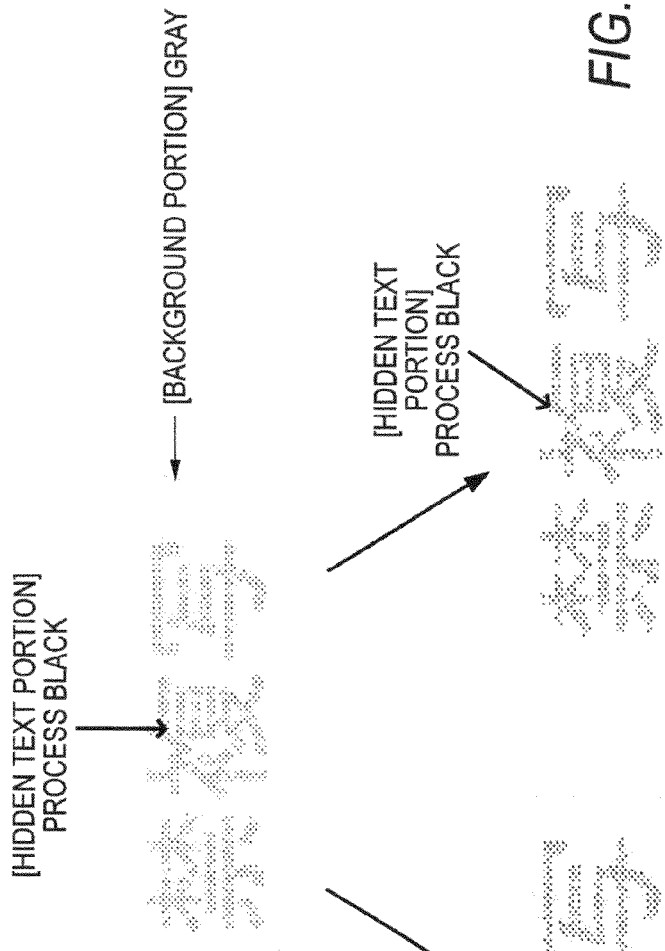
FIGS. 18A, 18B and 18C illustrate the state of printing with dot pattern code.

FIG. 18A illustrates the dot pattern code printed out according to the color arrangement structure illustrated in FIG. 16A, in which the hidden text portion of the dot pattern code is printed out in the color of process black and the background portion of the dot pattern code is printed out in the color of gray. In the original of the printing paper having this dot pattern code, the hidden text portion and the background portion are not distinguishable from each other so that the hidden text portion does not require recognition of its presence.

When the original of the printing paper having the above dot pattern code is subjected to copying processing, the hidden text portion is printed out in the color of process black as illustrated in FIG. 18B and the background portion is printed out in the color of light gray. The background portion becomes light gray because the color materials are arranged at regular intervals as in the structure illustrated in FIG. 16B.

This means that due to decrease in the contrast of the background portion in the dot pattern code of the copy of the printing paper, the difference from the contrast of the hidden text becomes large, leading to recognition of the hidden text portion after copying processing.

Figure 19A:
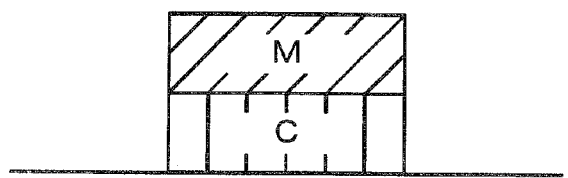
FIGS. 19A and 19B illustrate the state of color materials when a dot pattern code is printed out using any two of cyan, magenta, and yellow.
Figure 19B:
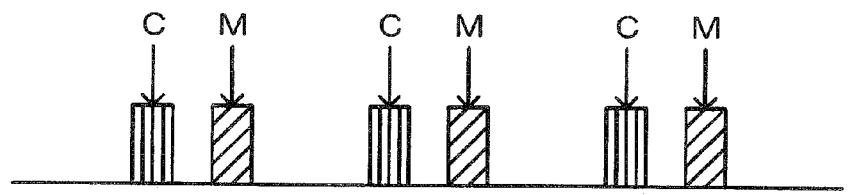

FIGS. 19A and 19B illustrate the state of color materials when a dot pattern code is printed out using any two of them.

In FIGS. 19A and 19B, an example when the dot pattern code is printed out using cyan and magenta is illustrated.

FIG. 19A illustrates the color arrangement state of the hidden text portion in which cyan and magenta have been stacked.

In FIG. 19A, two color materials are stacked. More specifically, a color material of magenta is placed on a color material of cyan. FIG. 19B illustrates the color arrangement state of the background portion and a plurality of combinations of cyan and magenta placed at a predetermined interval is arranged.

One example of a portion around the dot pattern code constituting the original of printing paper is illustrated in FIG. 20A.

FIG. 20A illustrates the original of the printing paper obtained by printing out the dot pattern code having the color arrangement states illustrated in FIGS. 19A and 19B. The hidden text portion is printed out in a bluish color and the background portion is printed out also in a light bluish color. The hidden text portion and the background portion are therefore not distinguishable from each other so that the hidden text portion does not require recognition of its presence.

When the original of the printing paper having the above dot pattern code is subjected to copying processing, the hidden text portion is printed out as is as illustrated in FIG. 20B and the background portion becomes light blue.

FIG. 20C illustrates a copy of the printing document when the distance between cyan and magenta is made greater than that shown in FIG. 19B. This means that the color becomes lighter than that of the background portion illustrated in FIG. 20B.

Figure 21A:
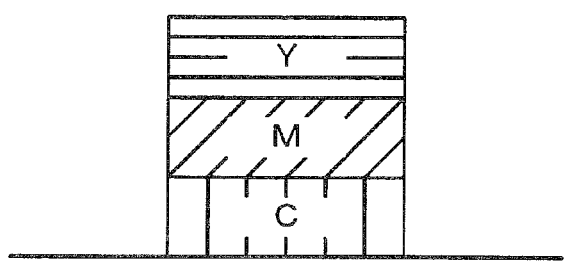
FIGS. 21A and 21B illustrate the state of color materials when a dot pattern code is printed out using cyan, magenta, yellow, and black.
Figure 21B:
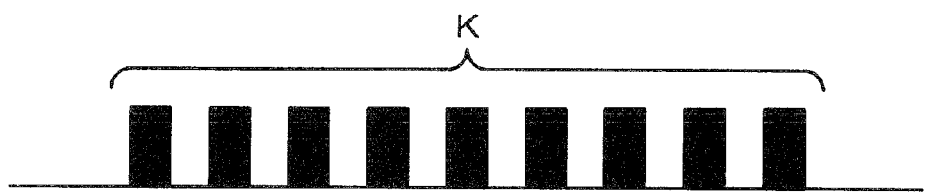

FIGS. 21A and 21B illustrate arrangement of color materials when a dot pattern code is printed out using cyan, magenta, yellow, and black.

FIG. 21A illustrates color materials when a dot pattern code is printed out using them. The color arrangement thereof is similar to that illustrated in FIG. 16A and three colors, that is, cyan, magenta, and yellow are stacked one after another, thus constituting a color of process black.

FIG. 21B illustrates the color arrangement using color materials of simple black color and they are placed at regular intervals.

Upon printing out, the number of lines of dots of the background portion is greater than that of the hidden text portion and the dot size of the hidden text portion is greater than that of the background portion.

An original of printing paper is prepared by printing out while carrying out the image control processing as described above. When this original of printing paper is subjected to copying processing, the hidden text portion becomes visible.

In the present invention, it is possible to carry out the above operations in a printing with dot pattern code system equipped with a communication function or to constitute a printing with dot pattern code system for performing the above processing by using a computer on which a program for constituting the above means has been installed from a recording medium (CD-ROM, DVD-ROM, or the like) having the program stored therein and allowing it to execute the program. In the computer constituting the printing with dot pattern code system, CPU (Central Processor Unit), ROM (Read Only Memory), RAM (Random Access Memory), and hard disk are connected via a system bus. The CPU carries out processing with RAM as a work area in accordance with the program stored in the ROM or hard disk.

The medium for supplying the program may be a communication medium (a medium for maintaining the program temporarily or not fixedly, such as communication line or communication system). For example, it is also possible to place the program on a bulletin board service (BBS) of a communication network and deliver it via a communication line.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   an image data forming unit that forms an image data which includes a first dot image to be visible by copying, a second dot image to be invisible by copying, a hidden text portion and a background portion; and
   an image forming unit that carries out image formation by using the image data formed by the image data forming unit,
   wherein
   the first dot image has a first color,
   the first dot image includes dots having a dot size increased by decreasing the number of lines of dots,
   the second dot image has a second color,
   the second dot images includes dots having a dot size decreased by increasing the number of lines of dots,
   the second dot image is stacked on the first dot image in at least one of the hidden text portion or the background portion,
   the image data forming unit places the first dot image in the hidden text portion,
   the image data forming unit places the second dot image in the hidden text portion and the background portion,
   the second dot image is stacked on the first dot image,
   the dots of the first dot image are magenta,
   dots of the second dot image in the hidden text portion are cyan and yellow,
   the dots of the second dot image in the hidden text portion are arranged at regular intervals,
   dots of the second dot image in the background portion are cyan, magenta and yellow, and
   the dots of the second dot image in the background portion are arranged at regular intervals.

2. An image forming apparatus comprising:
   an image data forming unit that forms an image data which includes a first dot image to be visible by copying, a second dot image to be invisible by copying, a hidden text portion and a background portion; and
   an image forming unit that carries out image formation by using the image data formed by the image data forming unit,
   wherein
   the first dot image has a first color,
   the first dot image includes dots having a dot size increased by decreasing the number of lines of dots,
   the second dot image has a second color,
   the second dot images includes dots having a dot size decreased by increasing the number of lines of dots, the second dot image is stacked on the first dot image in at
least one of the hidden text portion or the background
portion,
the image data forming unit places the first dot image in the
hidden text portion,
the image data forming unit places the second dot image in
the hidden text portion and the background portion,
the second dot image is stacked on the first dot image,
the dots of the first dot image and dots of the second dot
image in the hidden text portion are adjacent to each
other,
the dots of the second dot image in the hidden text portion
are cyan and yellow,
dots of the second dot image in the background portion are
cyan, magenta, and yellow, and
the dots of the second dot image in the background portion
are arranged at regular intervals.

3. An image forming apparatus comprising:
an image data forming unit that forms an image data which
includes a first dot image to be visible by copying, a
second dot image to be invisible by copying, a hidden
text portion and a background portion; and
an image forming unit that carries out image formation by
using the image data formed by the image data forming
unit,
wherein
the first dot image has a first color,
the first dot image includes dots having a dot size increased
by decreasing the number of lines of dots,
the second dot image has a second color,
the second dot images includes dots having a dot size
decreased by increasing the number of lines of dots,
the second dot image is stacked on the first dot image in at
least one of the hidden text portion or the background
portion,
the image data forming unit places the first dot image in the
hidden text portion and the background portion,
the image data forming unit places the second dot image in
background portion,
the second dot image is stacked on the first dot image,
dots of the first dot image in the hidden text portion are
black,
dots of the first dot image in the background portion are
magenta,
the dots of the second dot image in the background portion
are cyan and yellow, and
the dots of the second dot image are arranged at regular
intervals in the background portion.

4. An image forming apparatus comprising:
an image data forming unit that forms an image data which
includes a first dot image to be visible by copying, a
second dot image to be invisible by copying, a hidden
text portion and a background portion; and
an image forming unit that carries out image formation by
using the image data formed by the image data forming
unit,
wherein
the first dot image has a first color,
the first dot image includes dots having a dot size increased
by decreasing the number of lines of dots,
the second dot image has a second color,
the second dot images includes dots having a dot size
decreased by increasing the number of lines of dots,
the second dot image is stacked on the first dot image in at
least one of the hidden text portion or the background
portion,
the image data forming unit places the first dot image in the
hidden text portion and the background portion,
the image data forming unit places the second dot image in
the background portion,
the second dot image is stacked on the first dot image,
dots of the first dot image in the hidden text portion are a
first color and a second color,
dots of the first dot image in the background portion are the
second color,
the dots of the second dot image in the background section
are the first color, and
the dots of the second dot image in the background portion
are arranged at regular intervals.

5. An image forming apparatus comprising:
an image data forming unit that forms an image data which
includes a first dot image to be visible by copying, a
second dot image to be invisible by copying, a hidden
text portion and a background portion; and
an image forming unit that carries out image formation by
using the image data formed by the image data forming
unit,
wherein
the first dot image has a first color,
the first dot image includes dots having a dot size increased
by decreasing the number of lines of dots,
the second dot image has a second color,
the second dot images includes dots having a dot size
decreased by increasing the number of lines of dots,
the second dot image is stacked on the first dot image in at
least one of the hidden text portion or the background
portion,
the image data forming unit places the first dot image in the
hidden text portion and the background portion,
the image data forming unit places the second dot image in
the background portion,
the second dot image is stacked on the first dot image,
first dots of the first dot image in the hidden text portion are
a first color,
second dots of the first dot image in the hidden text portion
are a second color,
second dots of the first dot image is stacked on the first dots
of the first dot image in the hidden text portion,
dots of the first dot image in the background portion are the
second color,
the dots of the second dot image in the background portion
are the first color, and
the dots of the second dot image in the background portion
are arranged at regular intervals.

6. An image forming apparatus comprising:
an image data forming unit that forms an image data which
includes a first dot image to be visible by copying, a
second dot image to be invisible by copying, a hidden
text portion and a background portion; and
an image forming unit that carries out image formation by
using the image data formed by the image data forming
unit,
wherein
the first dot image has a first color,
the first dot image includes dots having a dot size increased
by decreasing the number of lines of dots,
the second dot image has a second color,
the second dot images includes dots having a dot size
decreased by increasing the number of lines of dots,
the second dot image is stacked on the first dot image in at
least one of the hidden text portion or the background
portion, the image data forming unit places the first dot image in the hidden text portion, the image data forming unit places the second dot image in the hidden text portion and the background portion, the second dot image is stacked on the first dot image, the dots of the first dot image in the hidden text portion are a first color, dots of the second dot image in the hidden portion are a second color, the dots of the second dot image in the hidden portion are arranged at regular intervals, dots of the second dot image in the background portion are the first color and the second color, and the dots of the second dot image in the background portion are arranged at regular intervals.

7. An image forming apparatus comprising:

an image data forming unit that forms an image data which includes a first dot image to be visible by copying, a second dot image to be invisible by copying, a hidden text portion and a background portion; and an image forming unit that carries out image formation by using the image data formed by the image data forming unit, wherein the first dot image has a first color, the first dot image includes dots having a dot size increased by decreasing the number of lines of dots, the second dot image has a second color, the second dot images includes dots having a dot size decreased by increasing the number of lines of dots, the second dot image is stacked on the first dot image in at least one of the hidden text portion or the background portion, the image data forming unit places the first dot image in the hidden text portion and the background portion, the image data forming unit places the second dot image in the hidden text portion and the background portion, the second dot image is stacked on the first dot image, dots of the first dot image in the hidden text portion are a first color, dots of the first dot image in the background portion are a second color, dots of the second dot image in the hidden portion are the second color, and dots of the second dot image in the background portion are the first color.

8. An image forming apparatus comprising:

an image data forming unit that forms an image data which includes a first dot image to be visible by copying, a second dot image to be invisible by copying, a hidden text portion and a background portion; and an image forming unit that carries out image formation by using the image data formed by the image data forming unit, wherein the first dot image has a first color, the first dot image includes dots having a dot size increased by decreasing the number of lines of dots, the second dot image has a second color, the second dot images includes dots having a dot size decreased by increasing the number of lines of dots, the second dot image is stacked on the first dot image in at least one of the hidden text portion or the background portion, the image data forming unit places the first dot image in the hidden text portion, the image data forming unit places the second dot image in the background portion, the dots of the first dot image in the hidden text portion are magenta, cyan and yellow, magenta dots of the first dot image, cyan dots of the first dot image and yellow dots of the first dot image are stacked with one another, the dots of the second dot image in the background portion are magenta, cyan and yellow, and the dots of the second dot image in the background portion are arranged at regular intervals.

9. An image forming apparatus comprising:

an image data forming unit that forms an image data which includes a first dot image to be visible by copying, a second dot image to be invisible by copying, a hidden text portion and a background portion; and an image forming unit that carries out image formation by using the image data formed by the image data forming unit, wherein the first dot image has a first color, the first dot image includes dots having a dot size increased by decreasing the number of lines of dots, the second dot image has a second color, the second dot images includes dots having a dot size decreased by increasing the number of lines of dots, the second dot image is stacked on the first dot image in at least one of the hidden text portion or the background portion, the image data forming unit places the first dot image in the hidden text portion, the image data forming unit places the second dot image in the background portion, the dots of the first dot image in the hidden text portion are magenta, cyan and yellow, magenta dots of the first dot image, cyan dots of the first dot image and yellow dots of the first dot image are stacked with one another, the dots of the second dot image in the background portion are black, and the dots of the second dot image in the background portion are arranged at regular intervals.

\* \* \* \* \*